United States Patent [19]

Sieberhagen

[11] Patent Number: 4,784,180

[45] Date of Patent: Nov. 15, 1988

[54] SANITARY MIXING VALVE ASSEMBLY

[75] Inventor: Günter Sieberhagen, Hagen, Fed. Rep. of Germany

[73] Assignee: Knebel & Rottger GmbH & Co., Iserlohn, Fed. Rep. of Germany

[21] Appl. No.: 99,305

[22] Filed: Sep. 18, 1987

[30] Foreign Application Priority Data

Feb. 24, 1987 [DE] Fed. Rep. of Germany ....... 3705772

[51] Int. Cl.$^4$ ............................................. F16K 11/18
[52] U.S. Cl. ............................. 137/636.4; 137/625.4; 137/607; 137/898; 251/291; 251/297
[58] Field of Search ................. 137/636, 636.1, 636.4, 137/625.17, 625.4, 625.41, 607, 898; 251/291, 297, 95

[56] References Cited

U.S. PATENT DOCUMENTS

| | | | |
|---|---|---|---|
| 1,840,961 | 1/1932 | Kuenzler | 137/607 |
| 1,970,039 | 8/1934 | Fraser | 137/607 |
| 2,575,940 | 11/1951 | Brown, Jr. | 137/607 |
| 3,037,526 | 6/1962 | Wheeler | 137/636.4 |
| 3,348,561 | 10/1967 | MacLennan | 137/636.4 |
| 3,503,586 | 3/1970 | Bordes | 251/291 |
| 3,763,875 | 10/1973 | Mobus et al. | 137/636.4 |
| 3,938,556 | 2/1976 | Hicks | 137/636.4 |

FOREIGN PATENT DOCUMENTS

| | | | |
|---|---|---|---|
| 2506886 | 12/1982 | Fed. Rep. of Germany | 137/625.41 |
| 927682 | 6/1963 | United Kingdom | 137/607 |

Primary Examiner—George L. Walton
Attorney, Agent, or Firm—Herbert Dubno

[57] ABSTRACT

The invention comprises a mixing valve assembly with a cold and hot water inlet, a mixing chamber, and a mixed water outlet, wherein the mixed water temperature is adjustable by rotation of the actuator, and wherein a constant water flow can be set by axial depression of the actuator. More reliable operation is achieved, along with simplifications in manufacture and installation, by having on the assembly a locking device for the actuator, so constructed that when the actuator is depressed it is held by the locking device in the new position but is released when again depressed.

18 Claims, 2 Drawing Sheets

SANITARY MIXING VALVE ASSEMBLY

FIELD OF THE INVENTION

My present invention relates to a sanitary mixing valve assembly with a cold and a warm water inlet, a mixing chamber, and an outlet for the mixed water, in which assembly of the mixed water temperature can be set by means of a rotatable actuator and a constant water flow can be set by depressing the same actuator axially in the direction of the assembly.

BACKGROUND OF THE INVENTION

Valve assemblies, superficially similar, are already known which, after manual opening, shut automatically after a time by virtue of a pressure equalizing channel. Such devices have the disadvantage that by mineral fouling of the narrow channel, the functioning of the entire assembly is rendered unreliable.

OBJECT OF THE INVENTION

It is an object of the invention to provide an improved mixing valve assembly which by its simplicity affords more reliable operation than achievable heretofore and which offers simplifications in manufacture and installation, which is capable of controlling water flow and temperature by a single actuator, and which maintains its setting reliably until deliberately reset.

SUMMARY OF THE INVENTION

This object is achieved, according to the invention by arranging a locking device in the valve assembly, the locking device operating on the actuator in such a way that when the actuator is depressed axially from its starting position, it is automatically held firmly, in the resultant position, but upon being depressed a second time in the direction of the valve assembly, the actuator automatically becomes movable.

This arrangement has the advantage that, in contrast to the prior art, means are made available to avoid factors which can disturb or cause the shutdown of a mixing valve assembly; thereby, higher reliability than heretofore is achieved, along with the simplification of manufacture and installation.

A preferred embodiment of the locking device, which is technologically advantageous, robust and compact, has a collar on the actuator which is rotatable but axially immovable with respect to the actuator, and having in the outer periphery of the collar at least one heart-shaped guide groove with two channels in the direction of the axis of the actuator and at a distance from one another, and two notches one behind the other, and with a firmly positioned locking stud so arranged that it is positionable along the length of the guide groove and can rest in either of the two notches.

For further simplification of the manufacture and installation of the mixing valve assembly, it is advantageous for both water inlets to have piston valves openable against spring pressure, and to have the outlets of these piston valves leading sequentially, in the direction of the water flow, to a mixing valve followed by a mixing chamber and a mixed water outlet, these components as well as the actuator together with the locking device being arranged in a common housing.

It is further advantageous to have the mixing valve arranged coaxial to the actuator and the piston valves arranged axially coaxial to the actuator and the piston valves arranged axially parallel to the actuator, and to have the closure body of the mixing valve coupled nonrotatably but axially movable within limits with respect to the actuator, and to have a pressure plate on the actuator which operates on both piston valves.

In this regard, it is further advantageous to have the outlets of both piston valves open through a common valve seat constructed on the face of the housing towards the actuator, the openings of said outlets being arranged concentrically to the axis of the actuator, and, closely fitted on said valve seat, a valve body in the form of the valve disk of a mixing valve, said valve disk having an opening with the same radial distance from the axis as the openings of the outlets from the piston valves, and so configured that by means of this opening in the valve disk, the openings of the outlets of the piston valves can be enlarged or reduced as desired. Moreover, a cap on the housing is provided, which together with the housing, forms a mixing chamber which is arranged, in the direction of water flow, beyond the mixing valve. In this cap, the actuator as well as the pressure plate are axially positionable, rotatable, and fitted in a tightly sealed manner.

It is also advantageous, from the standpoint of the problem to be solved, to have the valve disk provided with limitations to the rotation of the actuator, especially by having in the periphery of the disk a recess extending around part of the circumference of said disk, into which extends a protuberance or stud from the face of the housing facing toward the actuator.

According to another feature of the invention, the aforementioned pressure plate is tightly fitted around its circumference to the inner surface of the housing cap, a polygonally profiled stem extending from the valve disk in an axial direction toward the actuator. The stem penetrates conformably through a socket hole of matching polygonal profile in the actuator and said stem being axially positionable with respect to the actuator.

In another feature of the invention the aforementioned stem is provided with a spiral spring, one end of said spring pressing against the valve disk and the other end pressing against the proximate face of the actuator.

Advantageously, on the cap of the housing there is provided a coaxially arranged support within which the actuator together with the collar are rotatable and axially positionable, said support having attached to it a locking stud which engages the aforementioned guide slot, said support having as a fastening means a threaded adjustable nut.

The actuator can be attached nonrotatably to a rotatable handle which shields the aforementioned adjustable nut, said handle being detachably placed on said actuator.

The portion of the actuator protruding outside of the housing can terminate in a shank which penetrates conformable into a similarly profiled borehole in the aforementioned handle and having a circumferential groove on the actuator and a corresponding detent on the handle so as to attach the handle by spring action in a removable manner.

The aforementioned borehole conforming to the aforementioned shank as well as the detent corresponding to the circumferential groove are both in a hub which is fitted unrotatably into the handle.

A mixing valve assembly of the invention can comprise an actuator, a housing with two boreholes axially parallel to the actuator and at the same radial distance from the actuator, said boreholes opening on a valve seat of a mixing valve, each borehole having a threaded plug penetrated by a water inlet and each threaded plug having an axial cylindrical socket hole opening into the boreholes of the housing, and having in said socket holes a valve body positioned axially.

The valve body can be positioned in juxtaposition to an integrally-formed valve seat and biased toward said seat by a spring, and having attached to the valve body a coaxially positioned valve stem which penetrates through the valve seat with circumferential clearance.

The valve stem can also penetrate in a sealed and axially positionable manner into an aperture of the housing located axial to the valve body, the aperture having a diameter conforming to the valve stem, and the valve stem protruding out of the face of the housing facing and mixing valve.

The assembly can have beyond the valve seat of the piston valves in the direction of water flow, the mouth of the outlets leading to the valve seat of the mixing valve.

A further advantageous construction of the invention is a mixing valve assembly in accordance with the foregoing in which the cap on the housing on the outer surface conforms to the housing in profile and is tightly fitted by screw threads onto the housing in a loosenable manner.

A further advantageous construction of the invention is a mixing valve assembly in accordance with the foregoing in which the mixed water outlet is constructed as a channel penetrating through the housing parallel to the axis of the housing.

BRIEF DESCRIPTION OF THE DRAWING

The above and other objects, features and advantages of the invention will become more readily apparent from the following description, reference being made to the accompanying highly diagrammatic drawing in which.

SPECIFIC DESCRIPTION

Figure 1:
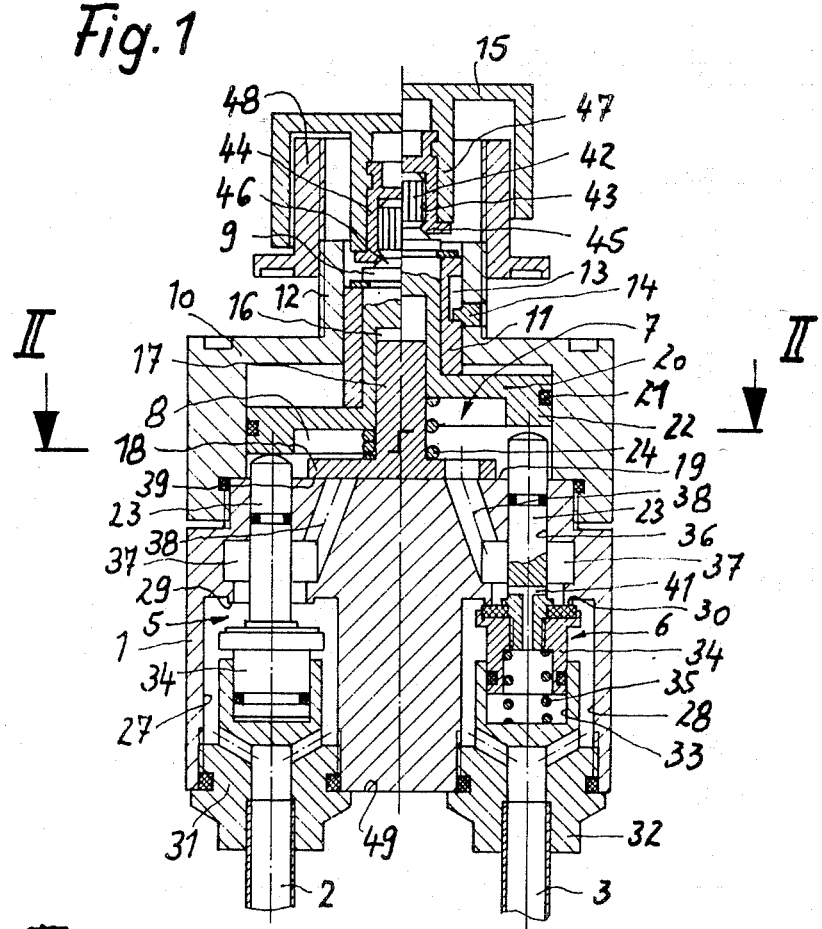
FIG. 1 shows a mixing valve assembly, cross-sectioned along line I—I of FIG. 2.
Figure 2:
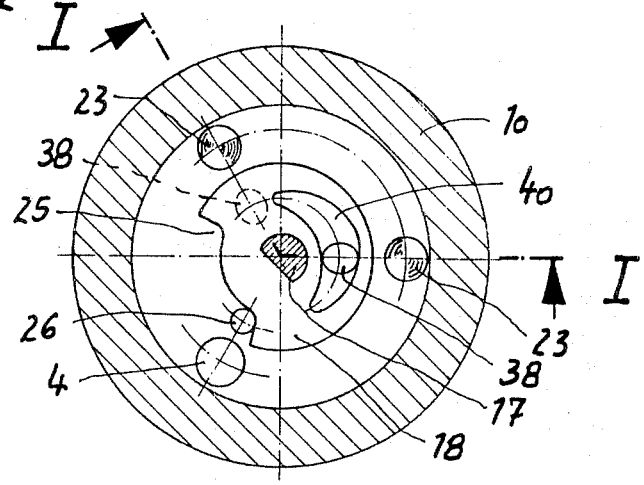
FIG. 2 shows the same assembly, in section along line II—II of FIG. 1.
Figure 3:
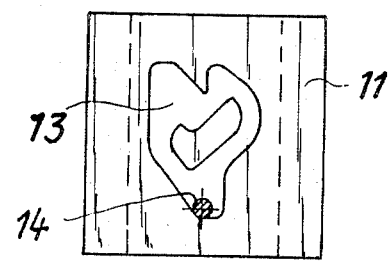
FIG. 3 shows a part of this assembly in side view in the shut position.
Figure 4:
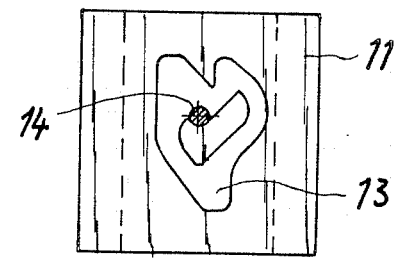
FIG. 4 is a similar view of the same part but in the open position

This mixing valve assembly comprises a housing 1 with a cold water inlet 2, a warm water inlet 3, a mixed water outlet 4, two piston valves 5 and 6 connected to the water inlets, a mixing valve 7 with a mixing chamber 8 and a manually-operable actuator 9.

On the housing 1 there is a cap 10 which is threaded so that it can be loosened or tightened. The housing 1 and cap 10 are externally cylindrical and coaxial to one another.

The actuator 9 has a rotatable and axially-immovable bushing 11 by means of which the actuator 9 is positioned in such a way in a short section of tubing 12, said tubing being integrally attached to and axially situated on the cap 10, in such a way that the actuator is rotatable within limits and movable axially within limits.

In addition, a locking device is provided which automatically holds the actuator firmly when it is depressed toward the housing but which automatically releases the actuator 9 when said actuator is depressed again towards the housing.

For this purpose, there is provided in the casing of the shaft an approximately heart-shaped guide slot 13 (which, by itself, is already known in the art) into which a locking stud 14 penetrates in such a manner that it can occupy varying positions along the length of the guide slot. The guide slot 13 is configured so that when the valve is shut, the locking stud 14 is in the apex end of the approximately heart-shaped guide slot whereas when the valve is open, the locking stud is in the upper notch of the said guide slot.

The actuator 9 carries a turning handle 15. Moreover, the actuator 9 also has, running in an axial direction, a socket--hole of polygonal profile through which a stem 17 penetrates, said stem being axially non-rotatable but axially slidable. The stem 17 extends from a valve disk which is coaxially positioned in the housing 1. The valve disk 18 is tightly fitted against the adjacent surface 19 of the housing 1. A cylindrical pressure plate 20 is integrally formed on the end of the actuator 9 facing towards the surface 19 of the housing. This pressure plate is axially movable in the cap 10 and also rotatable, and has a circumferential seal 21 which fits tightly against the inner surface of the cap 10.

The pressure plate 20 has an integral ring-shaped elevated region protruding toward the surface 10 of the housing, and positioned so as to be opposite to the stems of the piston valves 5 and 6 which open in the direction of the water flow.

On the stem 17, there is a coil spring positioned so as to apply spring pressure against the adjacent face of the actuator 9 and, at the other extremity of the spring, against the valve disk 18.

In part of the circumference of the valve disk 18 there is a recess 25 into which penetrates a stud 26 which extends from the surface 19 of the housing and which is positionable along the recess 25, the stud and recess acting together to provide limits to the rotation of the valve disk.

For the construction of the piston valves 5 and 6, the housing 1 is provided with two cylindrical boreholes 27 and 28 with parallel axes and equidistant from the axis of the housing. Each of these boreholes has, formed into it and penetrating inwards, valve seats 29 and 30. Also in the boreholes 27 and 28 there are threaded plugs, 31 and 32 respectively, tightly fitted but screwed in so as to be loosenable. The threaded plugs 31 as well as 32 are penetrated by cold water and warm water inlets respectively which connect to the two diagonal channels which open into the boreholes 27 and 28 respectively. In each of the threaded plugs 31 and 32 respectively there is also an axially-situated cylindrical borehole 33 into which a valve body 34 is inserted, held against the force of a spring element 35, particularly a spiral ring, situated in the borehole 33.

In each valve body 34 there is a valve stem 33 which is screwed in, which tightly fits into the borehole 36 which is coaxial to and connects with the boreholes 27 as well as 28, and which is axially positionable. The stem 33 at all times penetrates through and extends above the face 19 of the housing.

Proceeding in the direction of the water flow, beyond the valve seats 29 and 30 there is a chamber 37, larger in diameter than the valve stem 23, and from said chamber an outlet 38 extends, both such outlets opening into a common valve seat 39 of the mixing valve 7 which is against the face 19 of the housing.

In the valve disk 18 there is an approximately crescent moon shaped opening 40, so arranged that by means of this opening, the outlet 38 can be more or less opened or closed as desired.

In the valve stems 23, further holes 41 are provided for the venting of air from the socket holes 33.

The actuator 9 terminates in a shank 42, which penetrates nonrotatably into a correspondingly-profiled borehole in a hub 44. On this hub, a detent (locking element) 45 is integrally formed, which inserts under spring pressure, but in such a way that it can be loosened, into a circumferential groove 46 on the actuator 9. The hub 44 is attached firmly to a support member 47, which extends in the direction of the housing 1, on the rotating handle 15. On the support member 12 of the cap 10, there is affixed a tightening nut 48 for the valve assembly, attached by screw threads, over which the rotating handle 15 fits with clearance. The mixed water outlet, which is in the form of a channel penetrating through the housing 1 and parallel to the axis thereof, opens onto the lower face 49 and is provided with a pipe attachment not depicted.

It is intended to claim as being within the invention all those new features depicted in the FIGS. or herein described, individually or in combination.

We claim:

1. A mixing valve assembly comprising:
a housing formed with a cold water inlet, a hot water inlet, a mixing chamber connectable to said inlets, and a mixed water outlet connectable to said mixing chamber;
flow control valve means in said housing and mixed water temperature control means in said housing connected sequentially in the direction of water flow to said mixing chamber
an actuator operatively connected to the flow control valve means and the mixed water temperature control means, said flow control valve means being controlled by depression of the actuator and said mixed water temperature control valve means being controlled by rotation of the actuator; and
locking means for automatically holding said actuator in the position to which said actuator is depressed and automatically releasing said actuator upon a second depression of said actuator and a collar surrounding said actuator, said collar being rotatable but axially immovable with respect to said actuator, said collar defining in its periphery an approximately heart shaped guide slot having two notches one behind the other, said assembly having a fixed locking stud positionable with respect to the length of said guide slot and positionable in either of said nothces to hold the actuator in an axial position.

2. The mixing valve assembly defined in claim 1 in which the flow control valve means are piston valves for hot and cold water flow control, said piston valves being connected respectively to the hot and cold water inlets, spring means being provided to bias said piston valves towards the closed position, said flow control valves, mixed water temperature control valve means, and said mixing chamber together within said actuator and said locking means being arranged in common said housing.

3. The mixing valve assembly defined in claim 2 in which said mixed water temperature control means is a mixing valve coaxial to said actuator, said piston valves are axially parallel to said actuator, said mixing valve comprises a valve disk attached nonrotatably to said actuator and movable axially within limits with respect to said actuator, said actuator comprises a shaft and a pressure plate at the extremity of said shaft, and said piston valves have stems extending to said pressure plate upon which stems said pressure plate is arranged to be capable of exerting pressure to open the piston valves.

4. The mixing valve assembly defined in claim 3 in which the mixing valve comprises:
a valve seat defining the openings of both of said flow control valves, said openings being concentrically arranged with respect to the axis of said actuator;
a valve disk situated tightly adjacent to said valve seat and rotatable with respect to said valve seat, said valve disk serving as the valve body of the mixing valve, said valve disk having an opening at the same radial distance from the valve axis as the said outlets from the said piston valves, said opening so configured that said outlets from said piston valves can change in size in a stepless manner for mixed water temperature control; and the mixing valve assembly further comprising:
a cap linked to said housing of said valve assembly said cap together with said housing forming a mixing chamber beyond said mixing valve in the direction of water flow, and having in said cap said actuator which including its pressure plate is axially positionable, turnable and tightly sealed.

5. The mixing valve assembly defined in claim 4 wherein said valve disk has a recess conforming to the circumference of said disk and extending around part of the circumference of said disk, and wherein a stud extends from the face of the housing towards said actuator, said stud penetrating said recess to limit rotation of said valve disk.

6. The mixing valve assembly defined in claim 4 wherein said pressure plate is tightly fitted around its circumference to the inner surface of said cap, and wherein in said assembly there is a profiled stem extending from said valve disk in an axial direction toward said actuator, said actuator having a socket hole of matching profile penetrated by said stem, and said stem being axially positionable with respect to said actuator.

7. The mixing valve assembly defined in claim 6 wherein a spiral spring is positioned on said stem, one end of said spring pressing against said valve disk and the other end pressing against the proximate face of said actuator.

8. The mixing valve assembly defined in claim 4 in which on said cap there is provided a coaxially arranged support within which said actuator together with said collar are rotatable and axially positionable, a locking stud being affixed to said support and engaging the guide slot in said collar, and said support having as a fastening means an adjustable nut.

9. The mixing valve assembly defined in claim 8 which further comprises a rotatable handle attached operationally to said actuator, said handle shielding said adjustable nut, said handle being detachable placed on said actuator.

10. The mixing valve assembly defined in claim 9 wherein said actuator outside of said housing terminates as a spline, said spline penetrating conformably into a profiled borehole in said handle, said actuator having a circumferential groove, a detent being positioned on said handle, said detent fitting into said circumferential groove so as to attach said handle by spring action in a removable manner

11. The mixing valve assembly defined in claim 10 wherein a hub is fitted nonrotatably into the handle, said hub bearing the detent which fits the circumferential groove of the actuator.

12. The mixing valve assembly defined in claim 2 wherein:

said housing has two boreholes axially parallel to said actuator and at the time radial distance from said actuator, each borehole containing a piston valve for control of water flow, and each borehole having at one end a threaded plug each of said plugs being penetrated by a water inlet and each of said plugs having an axial cylindrical socket hole opening respectively into each of said boreholes, and having in each of said socket holes a valve body positioned axially and slidable axially, and each of said boreholes having at its other end an integrally-formed valve seat, said valve bodies being pressured toward said valve seats by springs to bias said valve bodies into the closed position, and said valve bodies having attached stems, said stems penetrating slidably through apertures in the said valve seats of said piston valves, and further penetrating slidably through conforming apertures in the housing, said stems producing out of the face of said housing facing said mixing valve;

the said mixing valve being positioned, in the direction of water flow, behind the valve seats of the piston valve, the valve seat of said mixing valve being penetrated by openings for water flow from the piston valves plugs being penetrated by a water inlet and each of said plugs having an axial cylindrical socket hole opening into the boreholes of the housing and having in said socket holes a valve body positioned axially and held against the pressure of a spring, an integrally -formed valve seat positioned opposite each of said valve bodies, and each of said valve bodies having attached to said valve body a coaxially positioned valve stem which penetrates through the valve seat with circumferential clearance, said valve stem penetrating in a tightly sealed and axially positionable manner a borehole of the housing located axial to the valve body said borehole having a diameter conforming to the valve stem, and said valve stem protruding out of the face of the housing facing the mixing valve, and said assembly having behind the valve seat of the piston valves in the direction of water flow the start of the outlets to the valve seat of the mixing valve.

13. The mixing valve assembly defined in claim 4 in which said cap conforms in profile to said housing and is fitted by screw threads onto said housing in a loosenable manner.

14. The mixing valve assembly defined in claim 2 in which said mixed water outlet is constructed as a channel penetrating through said housing parallel to the axis of said housing.

15. A sanitary mixing valve assembly, comprising:

a valve housing formed with a cold-water inlet, a hot-water inlet, and a mixed-water outlet;

a rotary mixing valve in said housing between said inlets and said outlets for effecting mixing of hot and cold water from said inlets to produce a mixture which is discharged from said outlet;

an actuator angularly coupled with said mixing valve for rotating said mixing valve about an axis, said actuator being shiftable along said axis relative to said housing and said mixing valve;

a spring in said housing bearing upon said actuator for biasing said actuator into one axial position;

a respective flow-control valve in each of said inlets having a stem displaceable parallel to said axis and positioned for engagement by said actuator upon displacement thereof axially from said one position to another axial position in which said inlets are unblocked, said flow-control valves communicating with said mixing valve in said other axial position; and detent means acting upon said actuator and effective to retain said actuator in each of said axial positions until said actuator is axially displaced, whereupon said actuator is then retained by said detent means in the other of said positions, said detent means includes a sleeve member formed on said actuator, said housing having a housing member surrounding and juxtaposed with said sleeve member, one of said members being formed with a generally heart-shaped recess having axially spaced notches, the other of said members being formed with a pin projecting radially into said recess and engagable selectively in said recesses in accordance with the position of said actuator.

16. The assembly defined in claim 15 wherein said generally heart-shaped recess is formed in said sleeve member.

17. The assembly defined in claim 15 wherein said mixing valve includes:

a housing body receiving said flow-control valves and formed with bores communicating with said flow-control valves and opening at respective ports at a face of said body perpendicular to said axis, and a mixing-valve disk pressed against said surface by said spring and formed with a crescent-shaped opening rotatable by said actuator into selective and variable communication with said ports.

18. The assembly defined in claim 17 wherein said stems project through said surface outwardly of said disk.

* * * * *